United States Patent
Break et al.

[19]

[11] Patent Number: 5,899,132
[45] Date of Patent: May 4, 1999

[54] TILTING SAW TABLE

[75] Inventors: Douglas G. Break, Livonia; Arthur B. Chubb, Romulus; Douglas J. Chubb, Dearborn; James R. Suyak, Lincoln Park, all of Mich.

[73] Assignee: Tapco Products Company, Inc., Plymouth, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/484,478

[22] Filed: Jun. 7, 1995

Related U.S. Application Data

[62] Division of application No. 08/111,830, Aug. 25, 1993, Pat. No. 5,473,968.

[51] Int. Cl.⁶ ....................................................... B27B 5/20
[52] U.S. Cl. ........................... 83/471.3; 83/486.1; 83/581; 83/574; 83/485; 144/286.1
[58] Field of Search ............................... 83/471.3, 486.1, 83/581, 574, 468.3, 490, 471.2, 471, 472, 473, 477, 477.1, 483, 485, 522.25, 455, 454, 468.9, 989, 876, 877, 564; 144/286.1, 286.5, 287, 379; 269/291, 295

[56] References Cited

U.S. PATENT DOCUMENTS

| | | | |
|---|---|---|---|
| 362,338 | 5/1887 | Walker | 83/471.3 X |
| 1,369,744 | 2/1921 | Hutchinson | 83/486.1 |
| 1,708,641 | 4/1929 | Trepte | 83/581 X |
| 1,733,532 | 10/1929 | Elliot | 83/486.1 |
| 2,208,582 | 7/1940 | Hollister | 83/471.3 |
| 2,711,194 | 6/1955 | Fisher | 83/574 X |
| 2,719,547 | 10/1955 | Gjerde | 83/468.3 X |
| 2,739,624 | 3/1956 | Haddock | 83/486.1 |
| 2,911,017 | 11/1959 | Holder | 83/574 |
| 2,937,672 | 5/1960 | Gjerde | 83/471.3 X |
| 3,821,918 | 7/1974 | Niehaus et al. | 83/471.3 |
| 3,872,755 | 3/1975 | Marsh et al. | 83/471.3 |
| 3,872,761 | 3/1975 | Gutowski et al. | 83/581 X |
| 4,154,435 | 5/1979 | Alessio | 144/286.1 X |
| 4,197,775 | 4/1980 | Handler et al. | 83/471.3 |
| 4,406,200 | 9/1983 | Kerr | 144/287 X |
| 4,452,117 | 6/1984 | Brickner et al. | 83/468 |
| 5,080,152 | 1/1992 | Collins et al. | 144/134 D |
| 5,473,968 | 12/1995 | Break et al. | 83/471.3 X |
| 5,651,298 | 7/1997 | Break et al. | 83/471.3 |

FOREIGN PATENT DOCUMENTS

| | | | |
|---|---|---|---|
| 0032383 | 7/1981 | European Pat. Off. | 83/473 |
| 004240793 | 12/1993 | Germany | 144/287 |

*Primary Examiner*—Rinaldi I. Rada
*Assistant Examiner*—Boyer Ashley
*Attorney, Agent, or Firm*—Howard & Howard

[57] ABSTRACT

A portable saw table which comprises an elongated saw table and a saw track pivotally mounted therebetween for a rotation about an axis substantially perpendicular to a longitudinal axis of the table base. A saw slide mounted on the saw track and supports a portable saw. A support at each end of the saw table allows the portable saw table to be tilted relative to the supports about a second axis parallel to the axis of the table. A sector member is pivotally connected to the table base so that as the table base is tilted, the sector member is moved in a plane perpendicular to the axis of the saw table. The sector member provides stability and guides the table and saw track. Thus, the table base, saw track and sector member can be tilted relative to the supports while the saw track is allowed to pivot relative to the table base and the sector member. A locking device on the supports engages the sector member to lock the saw table in a tilted position. In another form, the portable saw table is mounted on supports and locked in selected adjusted positions. The saw track and saw slide are constructed to minimize lateral movement of the saw slide.

10 Claims, 13 Drawing Sheets

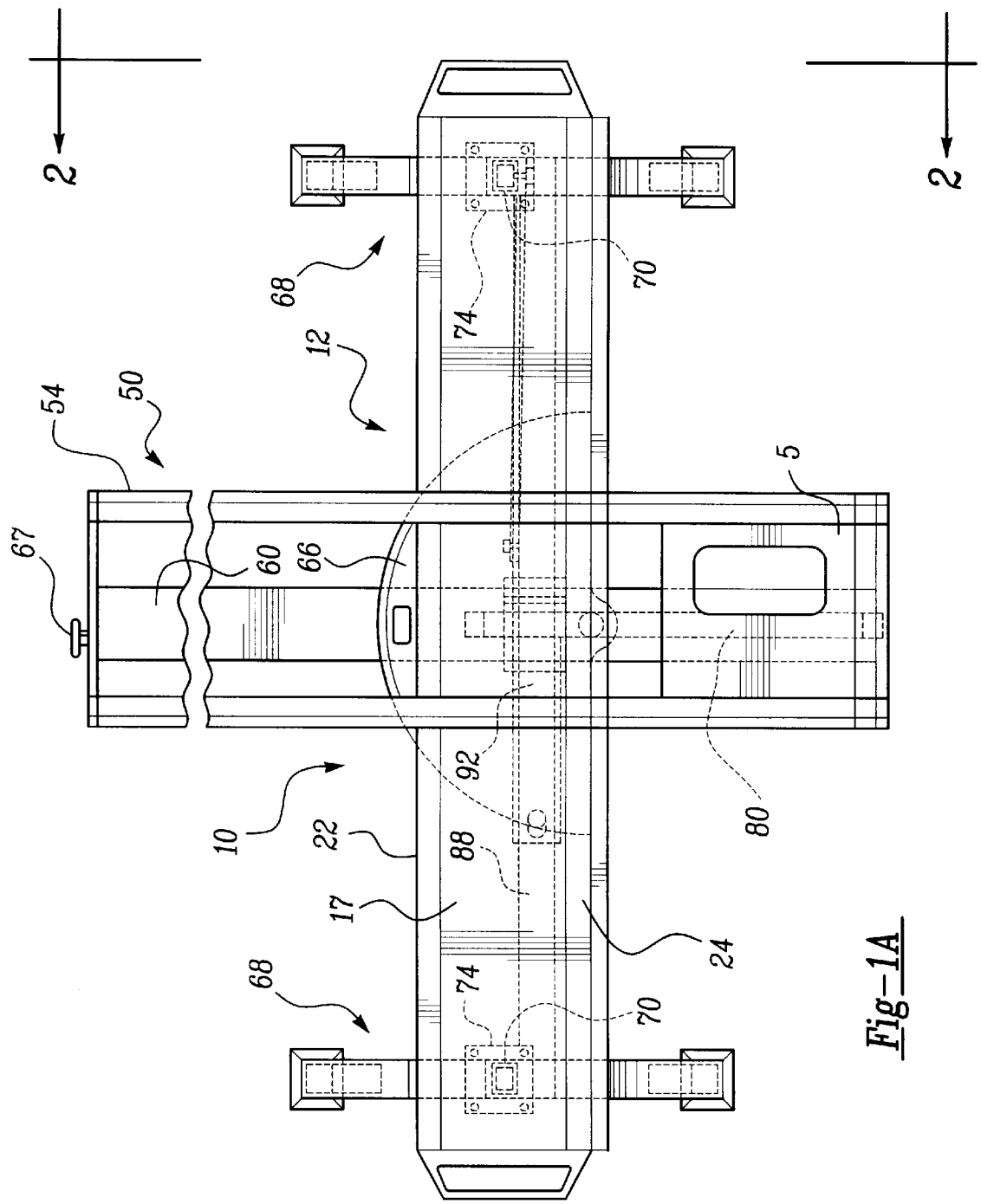

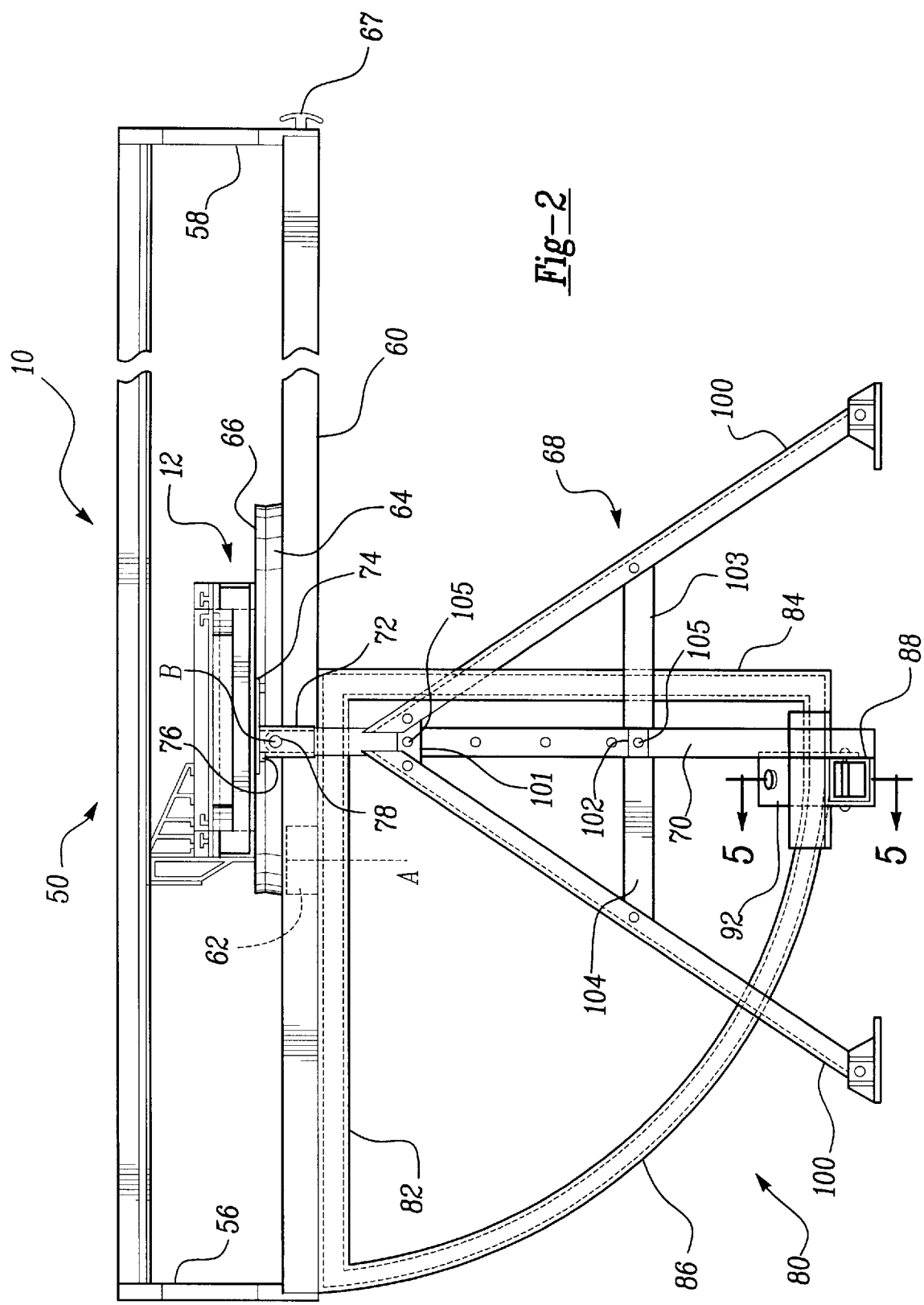

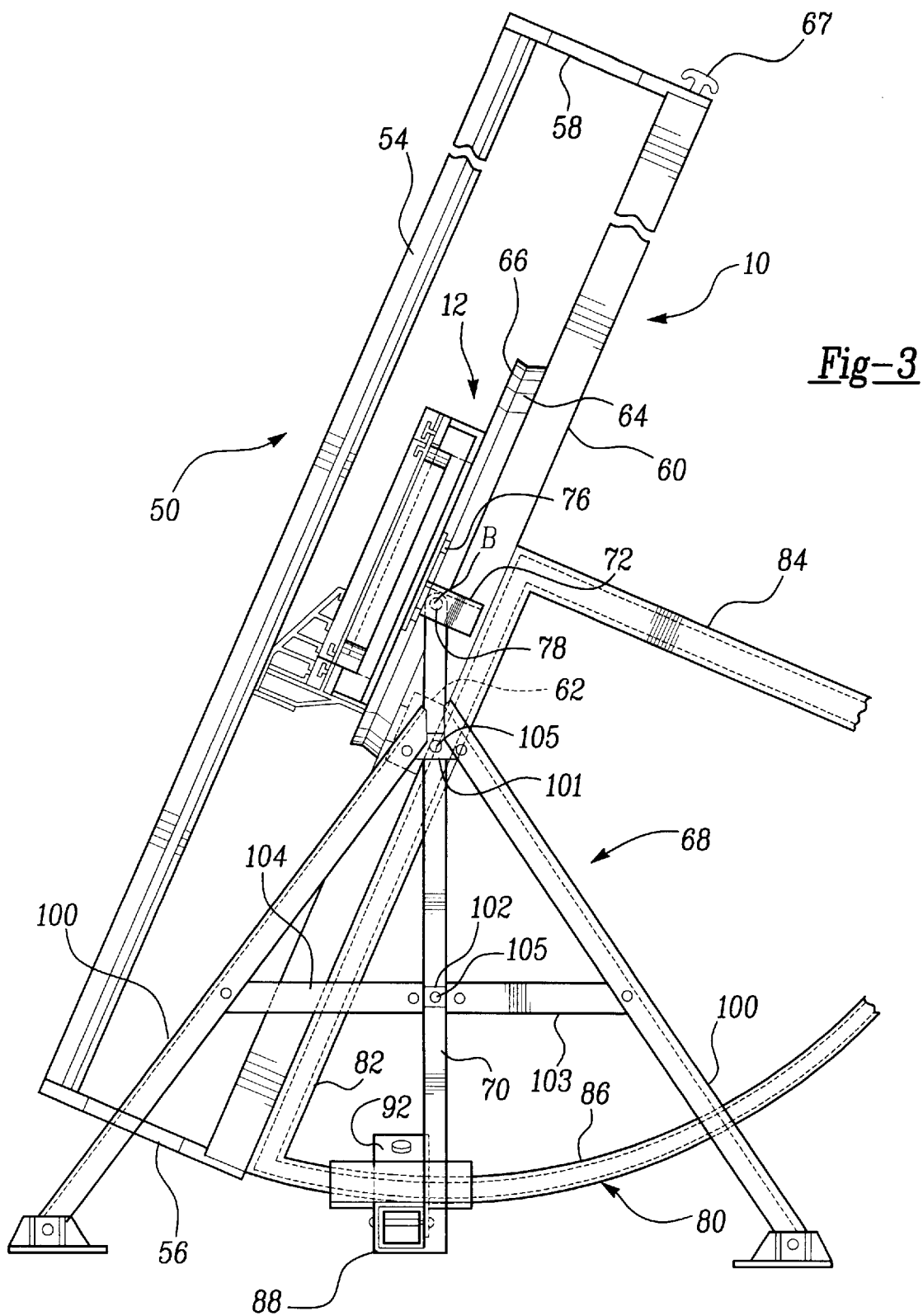

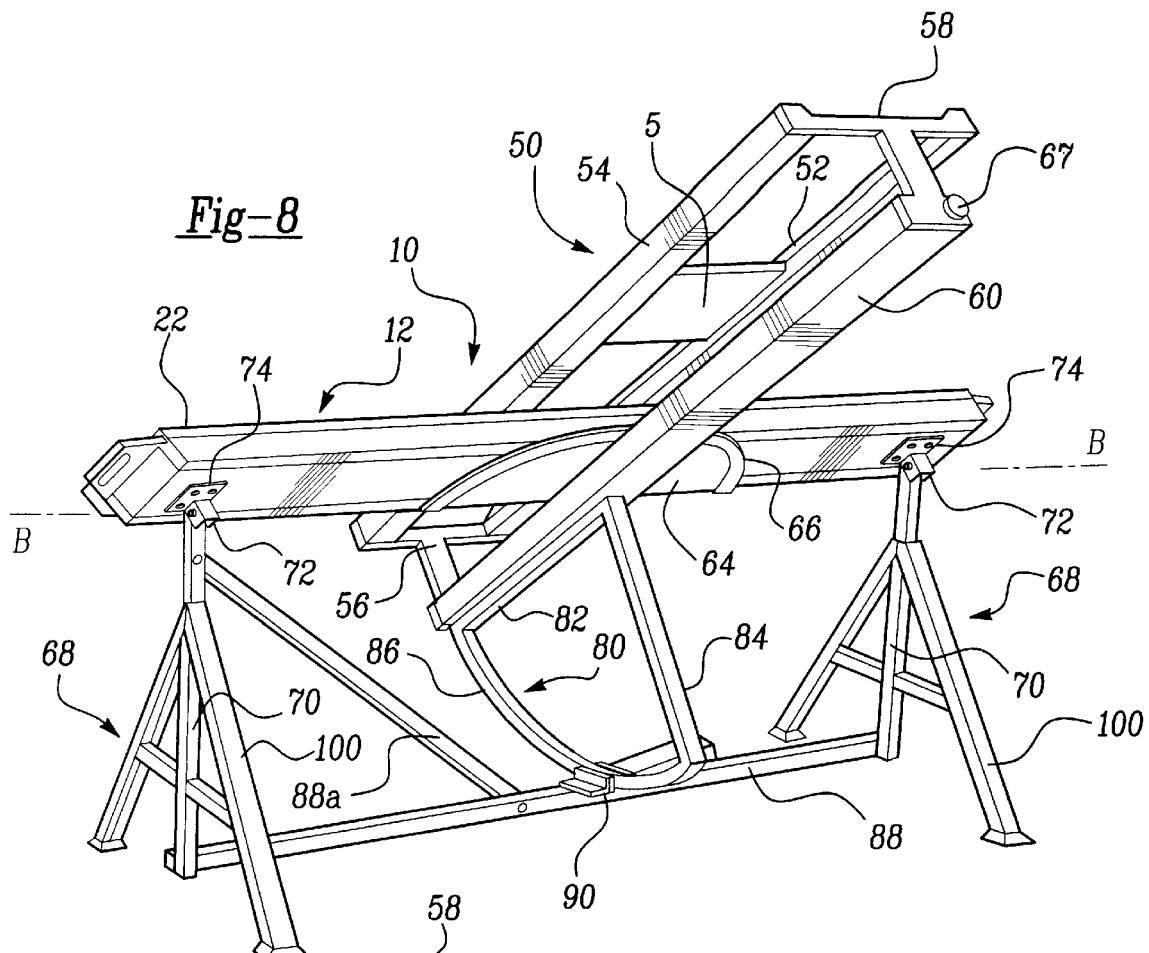
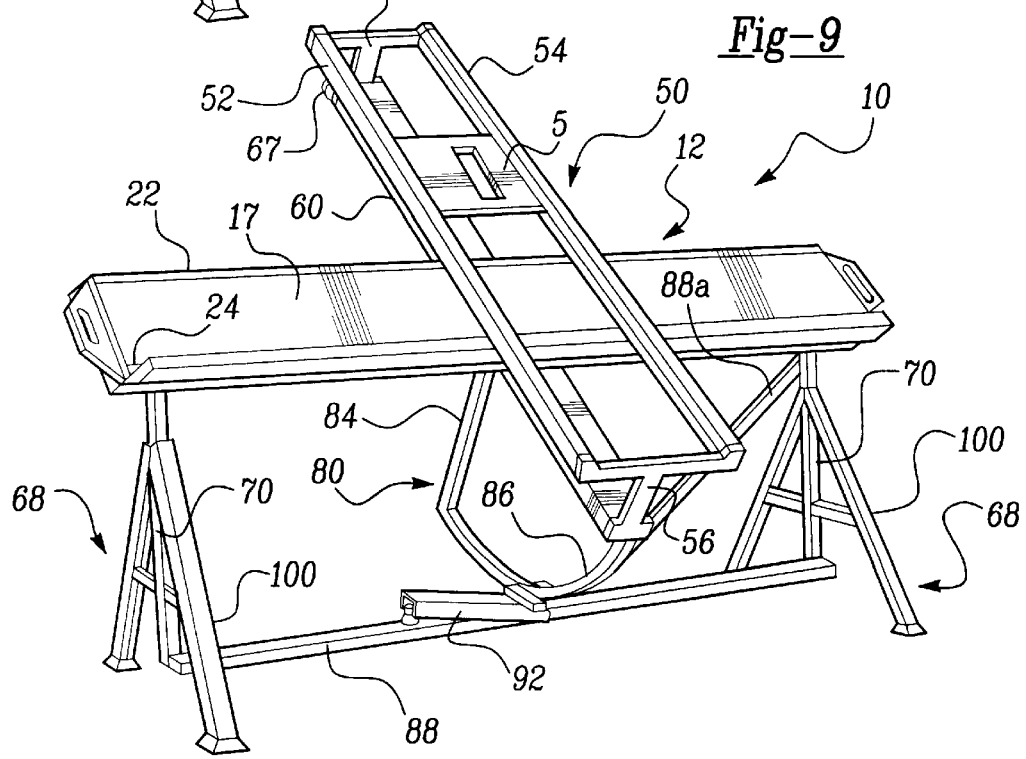

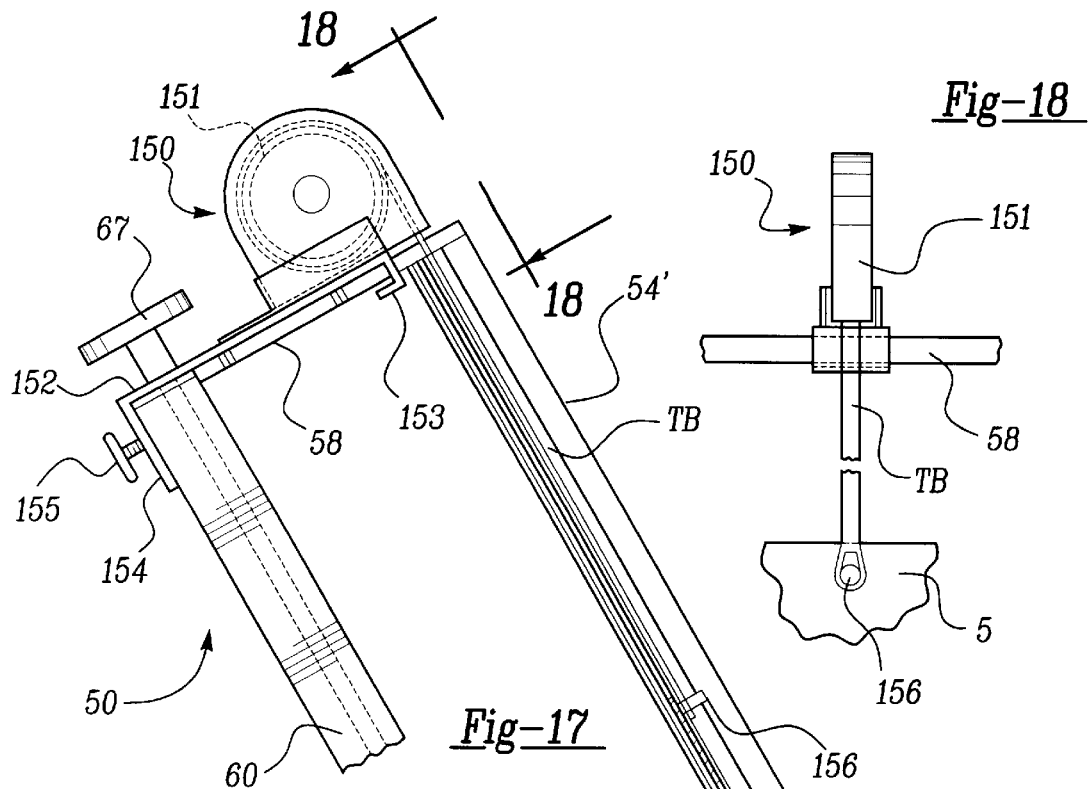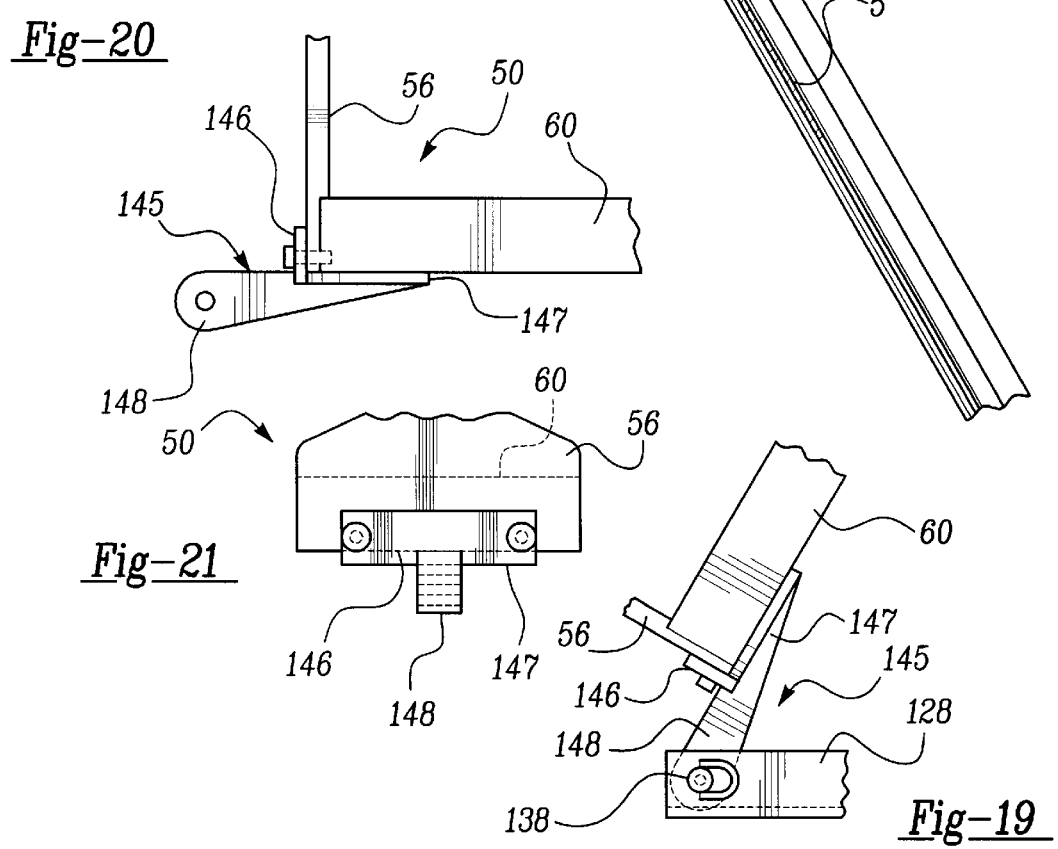

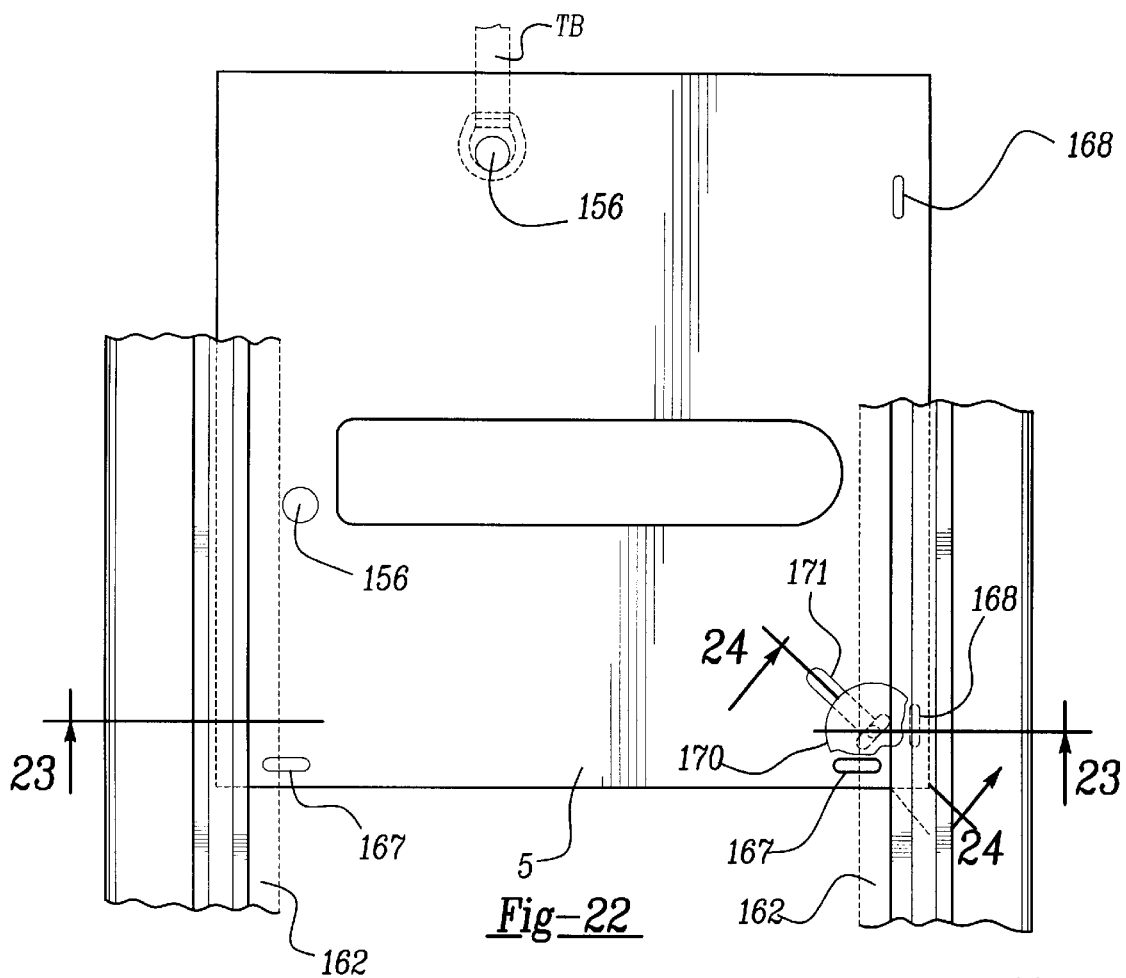
Fig-22
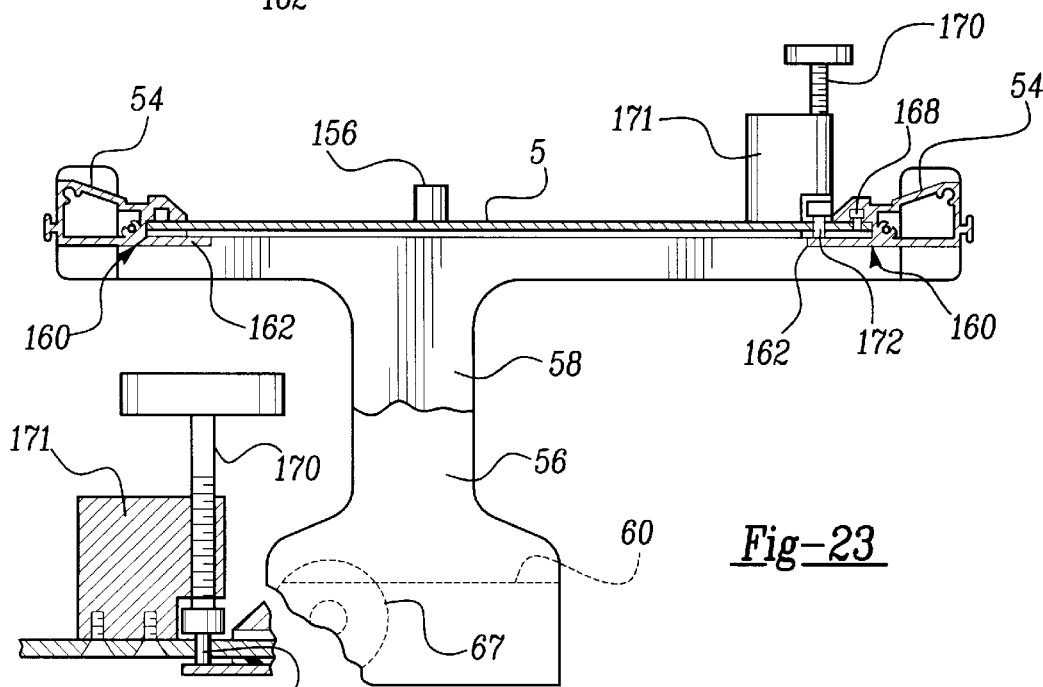
Fig-23
Fig-24

5,899,132

TILTING SAW TABLE

This is a divisional of the application Ser. No. 08/111,830, filed Aug. 25, 1993, now U.S. Pat. No. 5,473,968.

This invention relates to portable saw tables.

BACKGROUND OF THE INVENTION

Portable saw tables that can be transported to a job site and used are well known as shown, for example, in U.S. Pat. Nos. 3,821,918; 3,872,755; 4,197,775; 4,452,117; and 5,080,152.

An improved portable saw table is shown in co-pending U.S. patent application, Ser. No. 07/840,319, filed Feb. 24, 1992, which incorporates a saw table and a saw track pivoted relative to one another and a saw slide movable on the saw track and supporting a portable saw.

Such saws have not been readily tiltable for use in cutting large workpieces. In the building and construction industry, it is often necessary to support and cut large workpieces, for example, a workpiece having the dimensions of 4×8 feet. It is often desirable to support such large workpieces in a substantially vertical position due to the lack of space as well as for ease of handling the workpiece. In addition, the user must be able to reach across the workpiece in moving the saw.

It is known to provide non-portable tilt tables to support such large workpieces in a substantially vertical position. These devices are generally very large and are not easily portable making it difficult to transfer the device from one work site to another. In addition, these devices are expensive. These devices also do not have a provision for cutting at an angle to the major axis or minor axis of the workpiece.

Among the objectives of the present invention are to provide a portable saw table which overcomes the above-mentioned disadvantages; which supports large workpieces at an angle to the horizontal; which allows cutting at an angle to the major axis or minor axis of the workpiece when the workpiece is tilted at an angle; which is portable to be easily transferred from one work site to another; and which incorporates a novel saw slide and track.

SUMMARY OF THE INVENTION

In accordance with one form of the present invention, a portable saw table is provided having an elongated table base, a sector member and a saw track pivotally mounted therebetween by a pivot mount such that the saw track pivots relative to the table base and sector member about a first axis substantially perpendicular to the longitudinal axis of the table base. A saw table is provided on the saw track and supports a portable saw. Supports are provided at each end of the table base and are connected thereto to allow the table base, the saw track and the sector member to tilt relative to the supports about an axis substantially perpendicular to the first axis. Thus, the table base, saw track and sector member can tilt about one axis relative to the support and can be locked in the desired tilted position to support a workpiece. The saw track is additionally allowed to pivot about a second axis relative to the table base and the sector member to perform cross-cutting and rip-cutting operations. In another form, the portable saw table is mounted on supports and locked in selected adjusted positions. The saw track and saw slide are constructed to minimize lateral movement of the saw.

BRIEF DESCRIPTION OF THE DRAWINGS

FIG. 1A is a top plan view of the portable saw table in a retracted position;

FIG. 2 is an end view of the portable saw table taken from the right in FIG. 1;

FIG. 3 is a similar end view of the portable saw table in a tilted position;

FIG. 8 is a front perspective view showing the portable saw table in a tilted position;

FIG. 9 is a rear perspective view of the tilted portable saw table shown in FIG. 8;

FIG. 17 is a fragmentary view showing a counterbalance system on the saw track;

FIG. 18 is a fragmentary view taken along the line 18—18 in FIG. 17;

FIG. 19 is an end view of a further embodiment of the portable tilting saw table;

FIG. 20 is a view of a portion of the tilting saw table shown in FIG. 19;

FIG. 21 is an end view of the portion shown in FIG. 20;

FIG. 22 is a fragmentary plan view of the saw table;

FIG. 23 is a sectional view taken along the line 23—23 in FIG. 22;

FIG. 24 is a fragmentary sectional view taken along the line 24—24 in FIG. 22;

DETAILED DESCRIPTION

Figure 1:
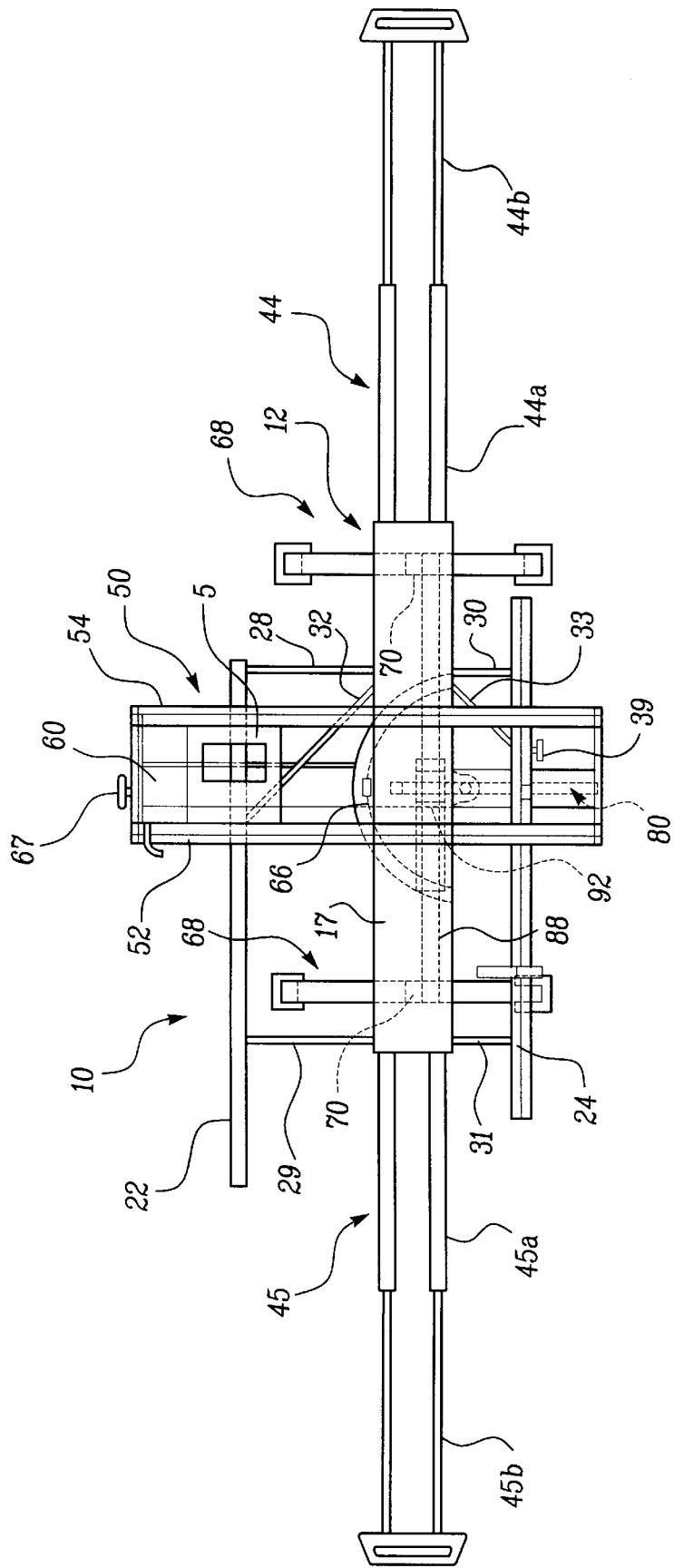
FIG. 1 is a top plan view of the portable saw table embodying the invention in an extended position.

Referring to FIG. 1, a portable saw table 10 embodying this invention with a table base 12 having a work surface 17 for supporting a workpiece. Extensions 22,24 are provided to expand the width of the table base. Pivot arms 28,29 pivotally connect extension 22 to the table base so that the extension 22 is swung about the pivot arms 28,29 from a retracted position to the extended position as shown. Similarly, extension 24 is connected to the table base 12 by pivot arms 30,31. Locking arms 32,33 are provided for each extension 22,24 to lock the extensions in the extended position by, for example, a locking knob 39. To extend the length of the table base 12, extensions 44,45 are provided where members 44a,44b and members 45a,45b are telescopically connected to each other and to the table base 12.

Saw track 50 comprises spaced track rails 52,54 connected at each end by front and back supports 56,58. A track base 60 connects and extends between the front and back supports 56,58. The track rails 52,54 support a portable saw mounted on a saw slide S adapted to slidably engage along the saw tracks 52,54. A protractor 64 is fixedly connected to the track base 60 and is pivotally mounted to an indexer plate 66 fixedly connected to the bottom of the table base 12 by a pivot mount 62 (FIG. 2). Thus, the table base 12 is positioned on the saw track 50 between the track base 60 and track rails 52,54 such that the saw track 50 can pivot an axis A perpendicular to the table base 12. A lock rod 67 is provided to lock the saw track 50 in the desired pivoted position.

The description thus far is substantially the same as the portable saw table as described in U.S. application Ser. No. 07/840,319, filed Feb. 24, 1992, incorporated herein by reference.

In accordance with the present invention, supports 68 are provided at each end of the table base 12 and are connected thereto to allow tilting of the table base 12 and thus the saw track 50 about a longitudinal axis B. To allow such tilting about the axis B, each support 68 has a vertical support 70 which has an opening (not shown) provided at an upper end thereof. The upper end of the vertical support 70 is received in a clevis 72 which comprises a U-shaped bracket member with openings (not shown) provided in each side thereof. One end of the clevis 72 is connected to a plate 74 fixedly secured to the bottom of table base 12 by any means such as bolts 76. The upper end of the vertical support 70 is received in the clevis 72 such that the openings are aligned. A pivot pin 78 is then inserted through the openings to secure the upper end of the vertical support 70 to the clevis 72.

A sector member 80 which may be made of tubular material has a first straight leg 82 pivotally connected to the track base 60 through the pivot mount 62. A second straight leg 84 is integral with and extends from one end of the leg 82 perpendicularly thereto, and an integral arcuate third leg 86 extends between the other end of the second leg 84 and the other end of the first leg 82. Leg 82 has a length that extends from a position rearwardly of the table base 12 as seen at the left in FIG. 2 to a point just past the center point of the track base 60. Leg 84 extends substantially from the bottom of track base 60 downward and terminates just short of a cross-strut 88. Arcuate leg 86 is defined by an arc having a radius having its center at the axis B of the table base extending substantially perpendicular to the axis B. A horizontal cross-strut 88 is secured to and extends between the vertical supports 70. A second strut 88a extends from cross-strut 88 upwardly at an angle and is connected to one of the vertical supports 70.

Figure 5:
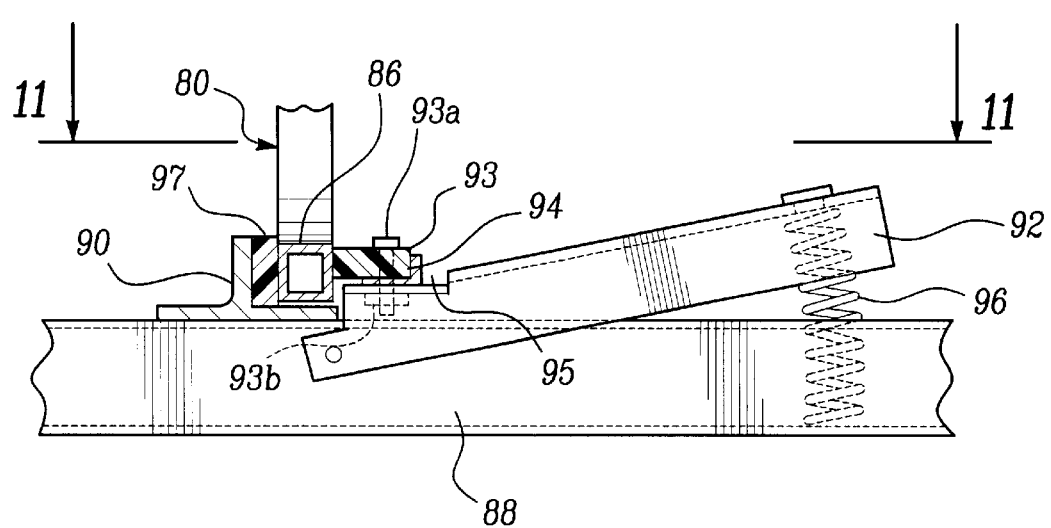
FIG. 5 is a sectional view taken along the line 5—5 of FIG. 2.
Figure 11:
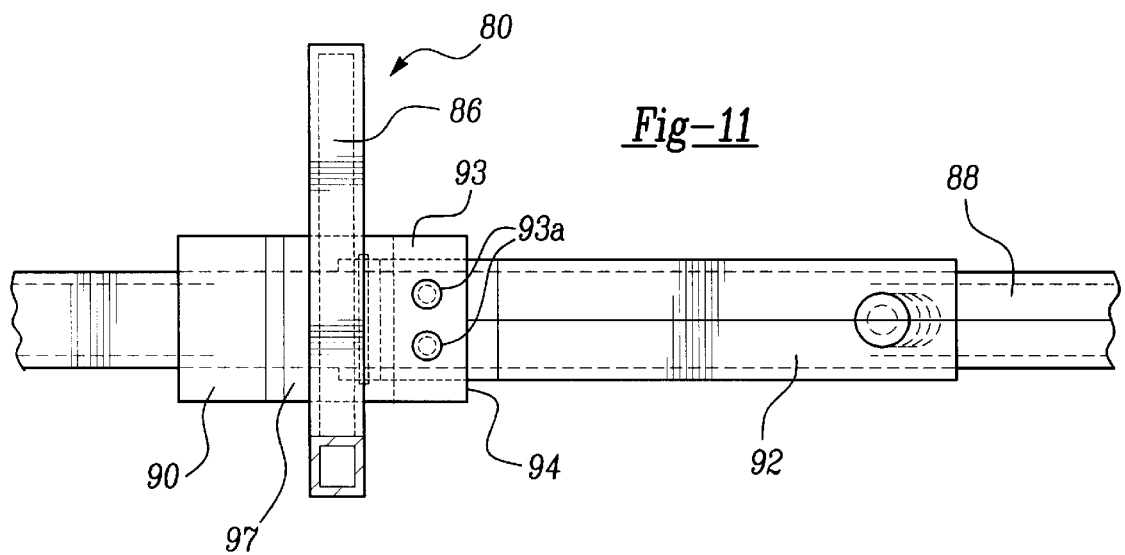
FIG. 11 is a view taken along the line 11—11 of FIG. 5.

Referring to FIGS. 5 and 11, means are provided for locking the saw table in any position and comprises a bracket mounted on the cross-strut 88 approximately midway between the vertical supports 70 adjacent the arcuate leg 86 of the sector member 80 for guiding and limiting movement of the sector member 80 as the table base 12 and saw track 50 tilt about axis B. It can be seen particularly in FIG. 2 that the sector member 80 is mounted on the saw track 60 such that the leg 84 extends just past the center point of the track base as seen from the left to shift the center of gravity of the sector member 80 and provide stability as the sector member 80 along with the saw track 50 and table base 12 tilt about the axis B. To secure the saw table in the tilted position, a spring loaded, foot operated lever 92 is pivoted to the strut 88. A pad 93 of friction material is fixed by any means, for example, a nut and bolt 93a,93b on a bracket 94 in a recess 95 and is urged by a spring 96 against the arcuate leg 86. The spring 96 extends between lever 92 and the strut 88. Preferably a pad 97 of friction material is provided on bracket 90 and the pad 93 urges the leg 86 against the pad 97.

The supports 68 are preferably adjustable wherein each leg 100 is pivotally connected at one end to the vertical support 70 by a clevis 101 and are additionally pivotally supported at a mid-portion thereof to the vertical support 70 by a clevis 102 pivoted to horizontal braces 103,104. Each clevis 101,102 telescopically receives and is slidable on the vertical support 70 and includes an opening for threaded engagement with a lock knob 105. Thus, it can be seen that when it is desired to adjust the height of the saw table 10, each lock knob 105 is loosened to allow the vertical support 70 to slide within each clevis 101,102. Upon reaching a desired height, each lock knob 105 is advanced through the clevis 101,102 to force the vertical support 70 into firm engagement with each clevis 101,102 to lock the saw table at the desired height.

In use, it can be seen in FIG. 3 that the entire portable saw table can be tilted relative to the supports 68 about the axis B. When such tilting movement is desired, the lever 92 is pressed against the action of the spring 96 to loosen the frictional engagement of the pads 93,97 to allow the arcuate leg 86 to slide within the bracket 90 as the saw table tilts. Once the desired tilting position is obtained, the lever 92 is released to frictionally hold the sector member 80 between the pads 93,97 to lock the saw table in the tilted position.

Figure 4:
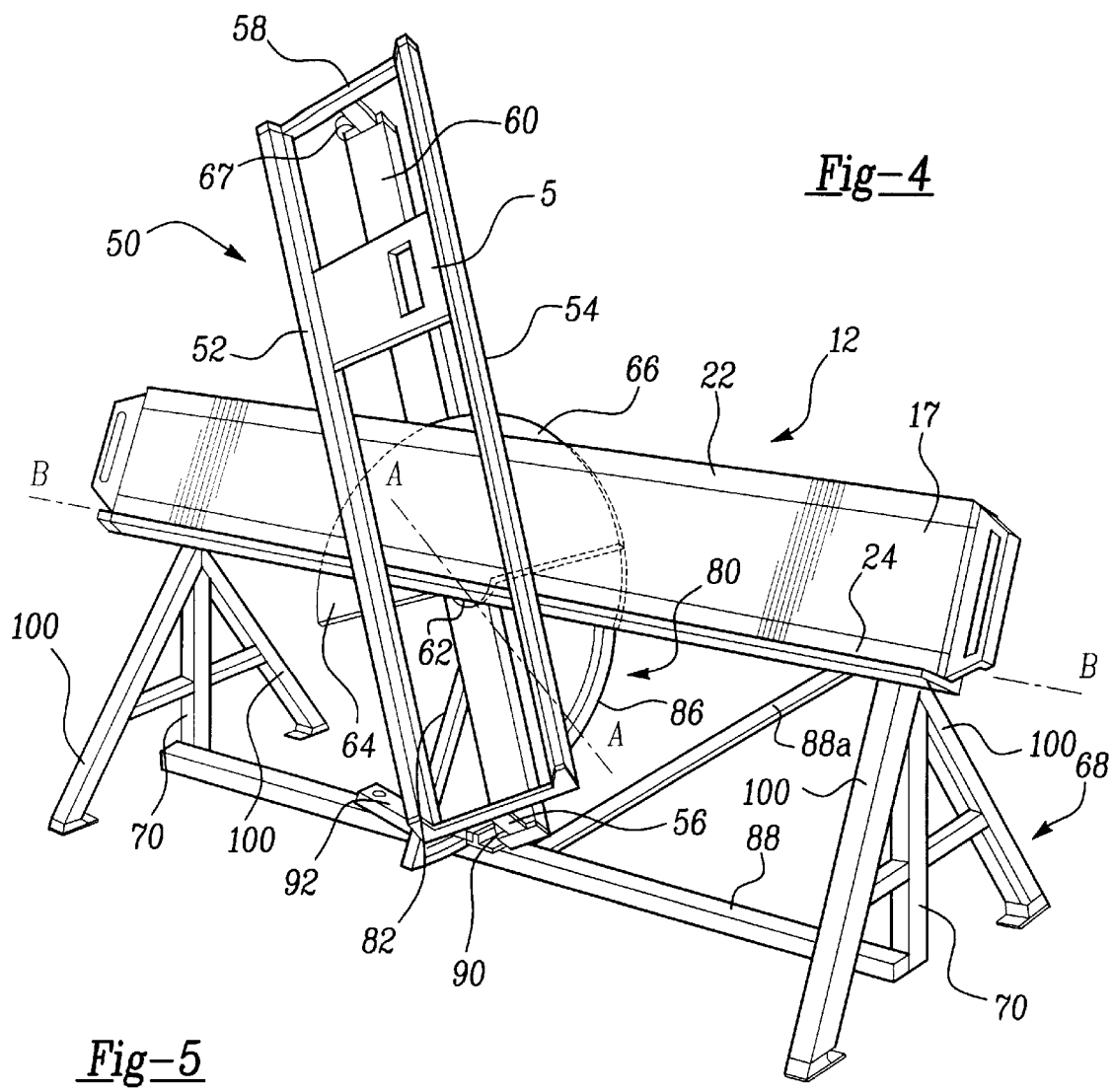
FIG. 4 is a rear perspective view of the portable saw table in a tilted position.

As shown in FIG. 4 it can be seen that in addition to the tilting of the saw table about the axis B, the saw track 50 can additionally be pivoted about axis A relative to the table base 12 and sector member 80.

Figure 6:
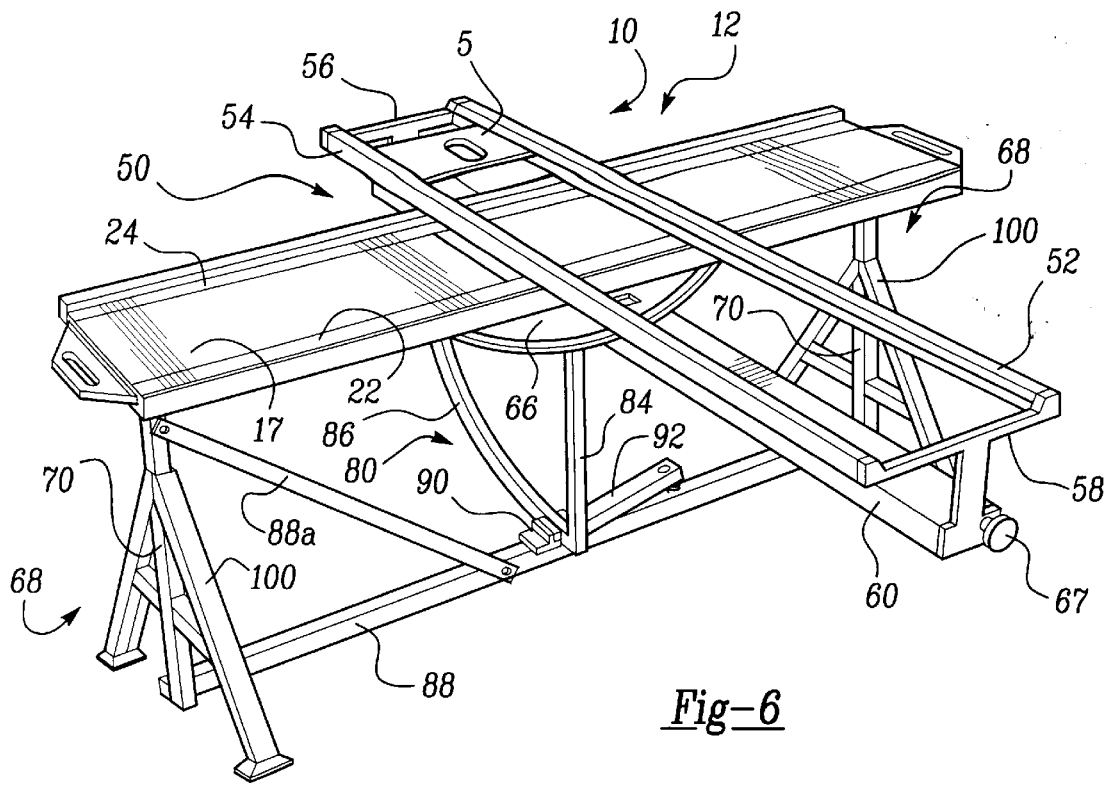
FIG. 6 is a front perspective view showing the portable saw table in a horizontal position and the saw track at ninety degrees to the table base.
Figure 7:
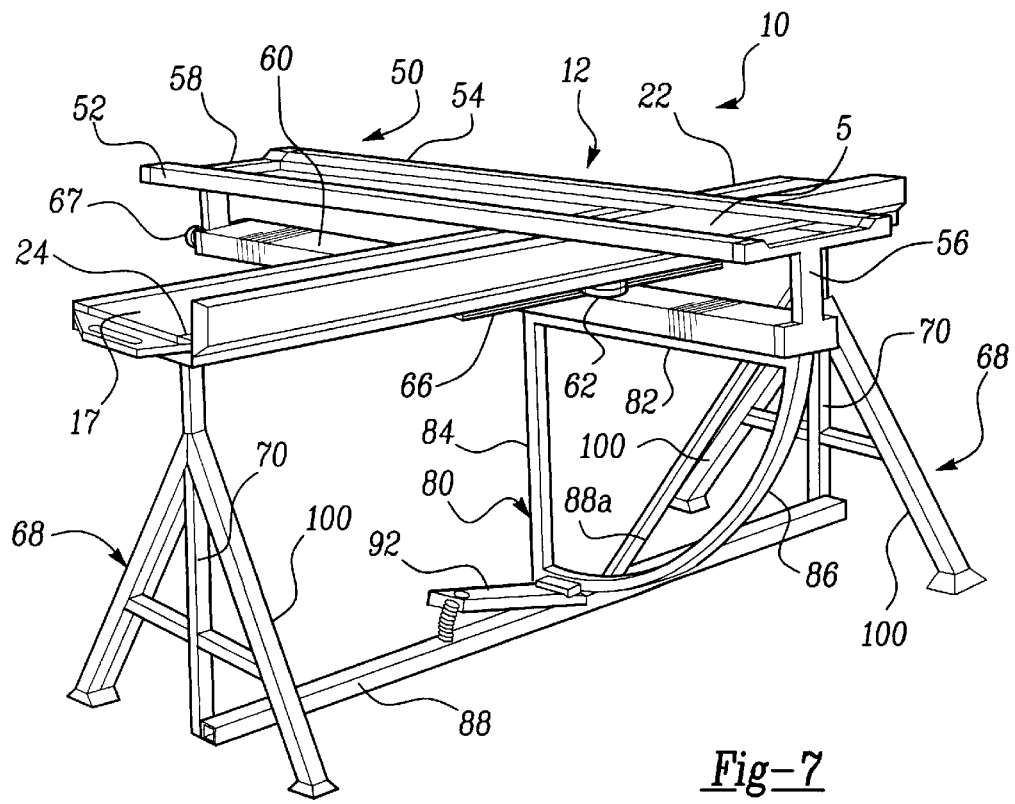
FIG. 7 is a rear perspective view showing the portable saw table in a horizontal position.
Figure 10:
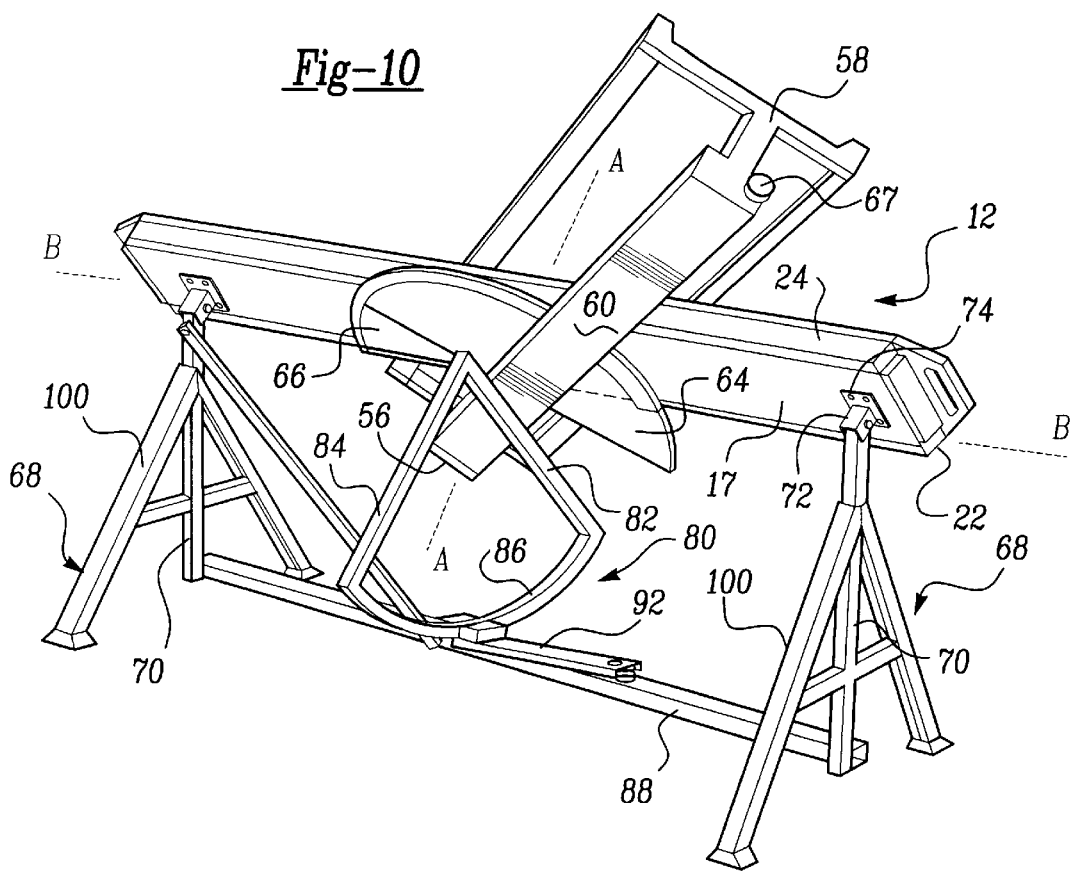
FIG. 10 is a front perspective view similar to FIG. 8 showing the saw track at an acute angle to the table base.

FIGS. 6 and 7 show the portable saw table 10 from the front and back, respectively, with the table base 12 and the saw track 50 in a horizontal position. FIGS. 8 and 9 show the portable saw table 10 from the front and back, respectively, with the table base 12 and the saw track 50 tilted about axis B. FIG. 10 shows the portable saw table 10 from the front with the table base 12 and the saw track 50 tilted about axis B and the saw track additionally pivoted about axis A.

Figure 12:
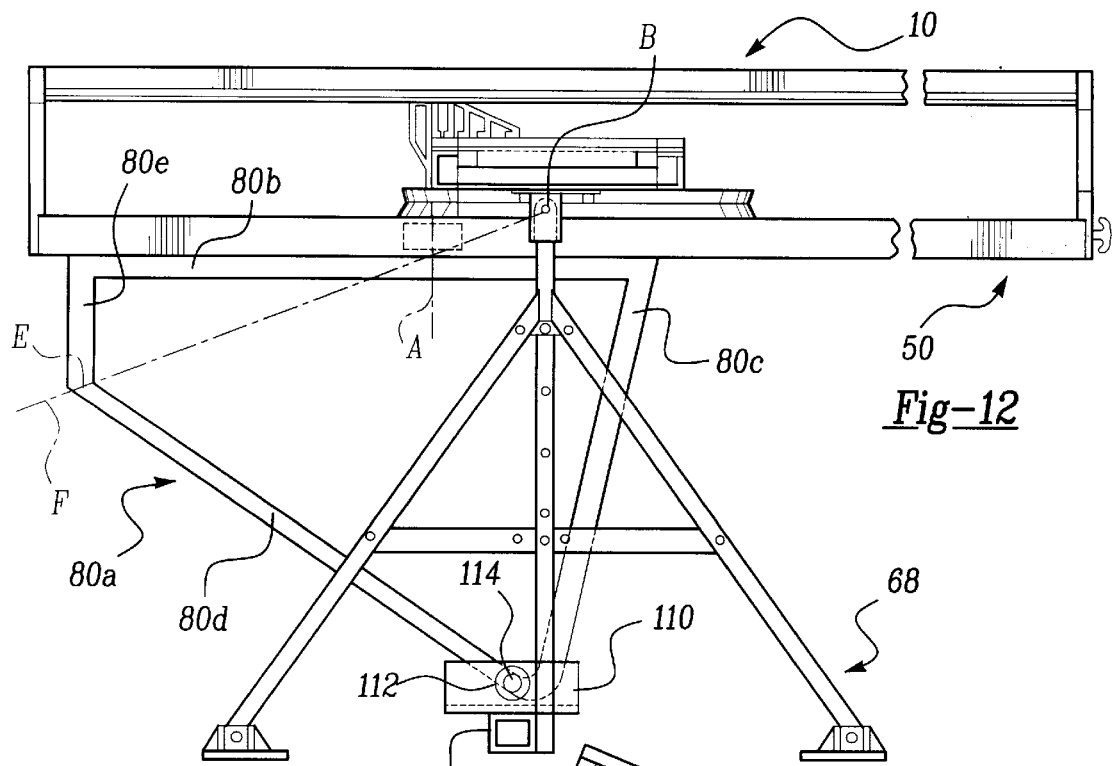
FIG. 12 is an end view similar to that shown in FIG. 2 of another embodiment of the present invention.
Figure 13:
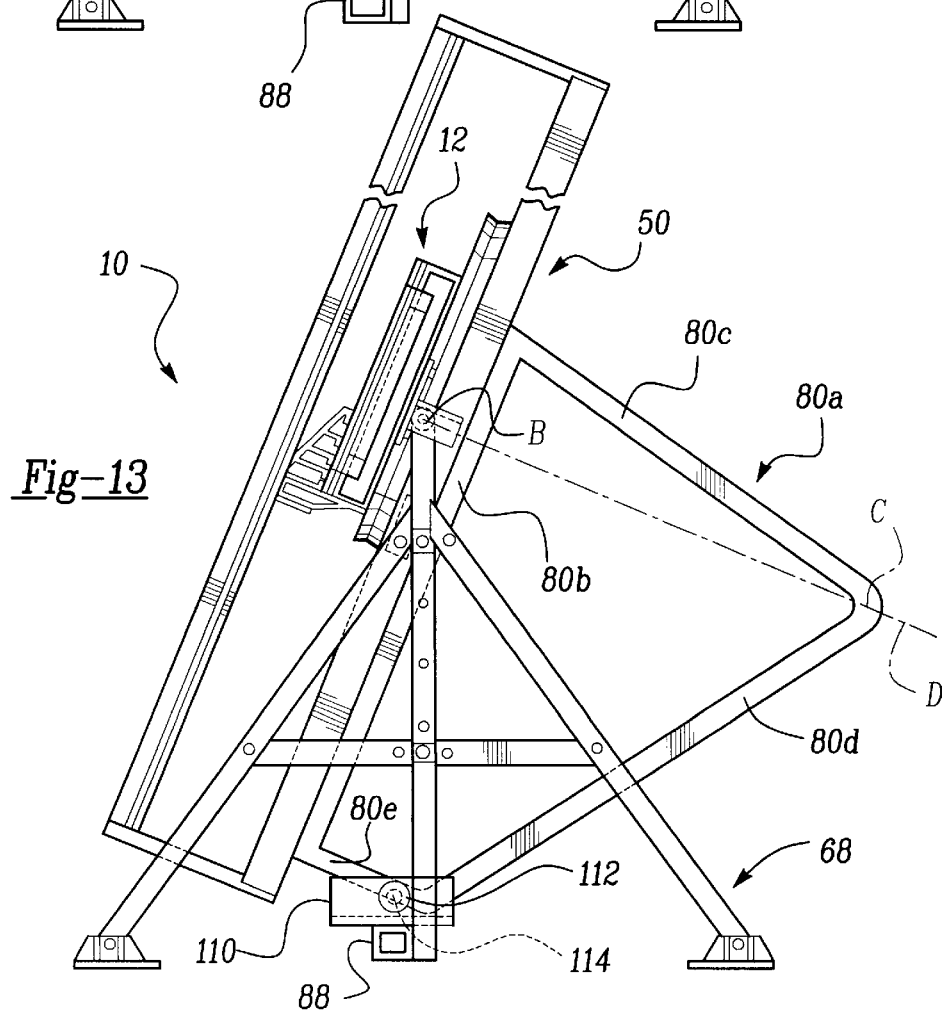
FIG. 13 is a similar end view of the portable saw table in a tilted position.

Another embodiment of the portable saw table 10 is seen in FIGS. 12 and 13 where a modified two-position sector member 80a is shown. The sector member 80a is a quadrilateral member having four integral legs 80b,80c,80d,80e and may be made of tubular material. Leg 80b is pivotally connected to the track base 60 through the pivot mount 62 and extends from a first end at the left end of the track base 60 as seen in FIG. 12 to a second end just past the center point of the track base 60. Leg 80c extends from the second end of leg 80b at an acute angle thereto to an end just short of the cross-strut 88. Leg 80d extends from the leg 80c at an acute angle thereto toward the track base 60 and joins leg 80c that extends from the first end of leg 80b. Legs 80c and 80d join at a point C that lies on an axis D extending through the center of the table base 60 at axis B. From point C, the leg 80c extends at an angle of approximately 13° from axis D while leg 80d extends from point C in an opposite direction at approximately 56° from axis D.

Legs 80d and 80e join at a point E that lies on an axis F extending through the center of the table base at axis B.

The sector member 80a is a two-position member used when only two positions are desired, that is, the horizontal position shown in FIG. 12 and the tilted position shown in FIG. 13. In the horizontal position (FIG. 12), point C is located directly beneath the center point of the track base at axis B. Point E is similarly located in the tilted position (FIG. 13).

To secure the portable saw table 10 in a tilted position, a C-shaped bracket 110 is connected to the cross-strut 88 approximately midway between the vertical supports 70 and receives the legs 80c,80d,80e of the sector member 80a for guiding and limiting movement thereof as the table base 12 and saw track 50 tilt about axis B. A lock knob 112 having a screw 114 associated therewith is provided in threaded engagement with a threaded opening in the bracket 110. As the lock knob 112 is rotated to advance the screw 114, the portion of the sector member 80a located within the bracket 110 is forced into firm engagement therewith to secure the sector member in the final position.

Figure 14:
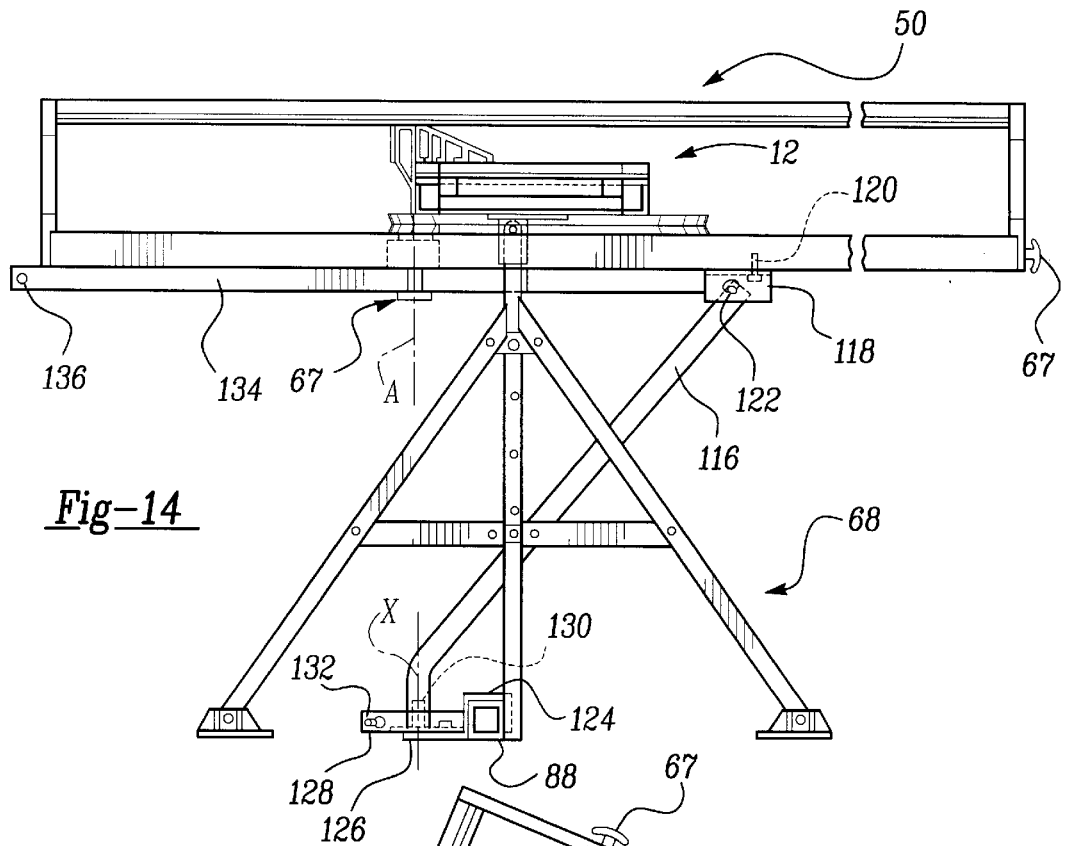
FIG. 14 is an end view similar to that shown in FIG. 2 of yet another embodiment of the present invention.
Figure 15:
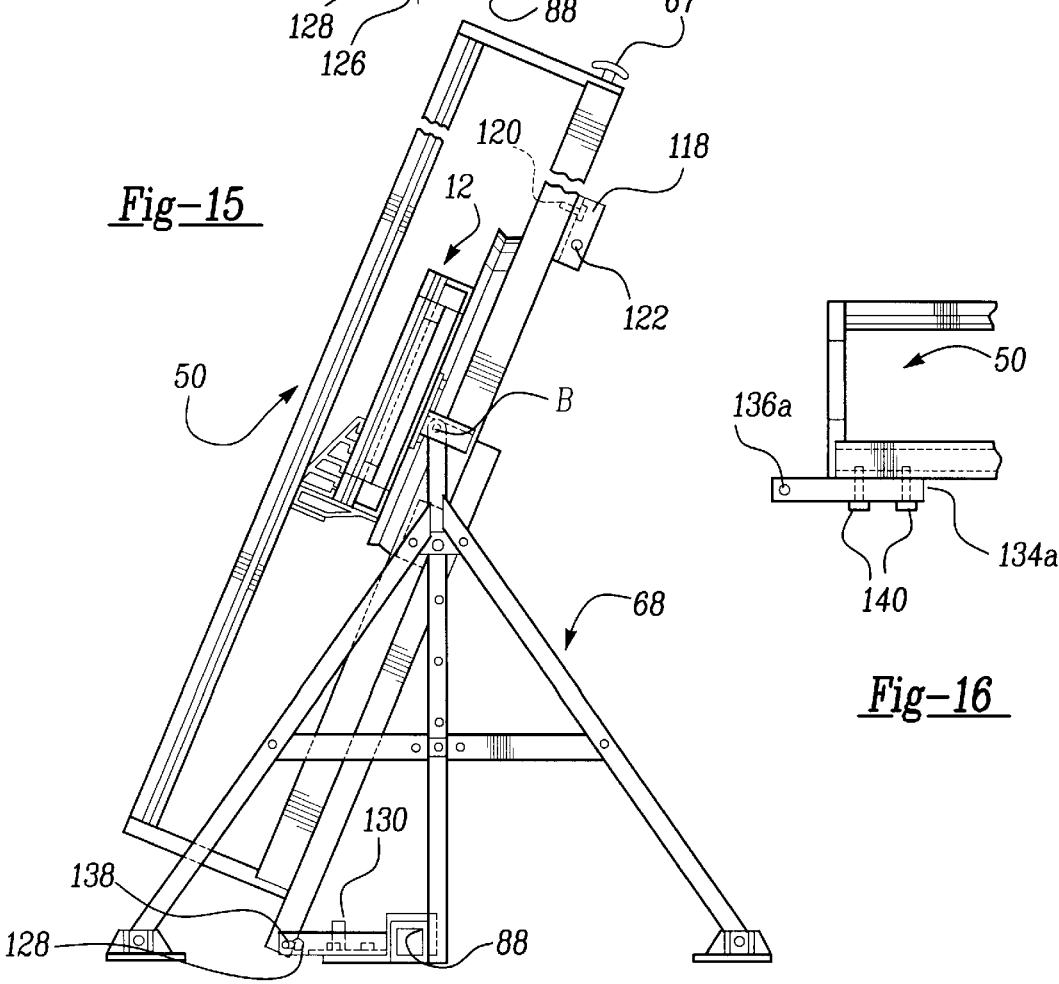
FIG. 15 is a similar end view of the portable saw table in a tilted position.

In yet another form of the invention seen in FIGS. 14 and 15, the portable saw table 10 is positioned in one of two positions. In the horizontal position of FIG. 14, the saw track 50 is pivotally supported by a swivel brace 116 removably connected to the saw track 50 by a U-shaped bracket 118 fastened to the saw track by a fastener 120. A pull pin 122 extends through openings in the sides of the bracket 118 and through an opening in the brace 116 to connect the brace 116 thereto.

The opposite end of the brace 116 is rotatably supported by a channel-shaped bracket 124 having an extension 126. The bracket 124 is placed over the cross-strut 88 to rest thereon. A lock bracket 128 is bolted to the extension 126. A stepped plug 130 is secured to the extension 126 and extends through an opening (not shown) in the lock bracket 128. The stepped plug 130 is received within the end of the hollow brace 116 and defines a pivot axis aligned with axis A about which the brace 116 and thus the saw track 50 pivots. The lock bracket further has an opening 132 on each side thereof.

A tilt arm bar 134 is connected to the saw track 50 through the pivot mount 62. The tilt arm bar 134 extends just past the end of the saw track 50 as seen at the left in FIG. 15 and has an opening 136 therein.

Thus, in the position of FIG. 14, the saw track 50 pivots about axis X extending through plug 130. To tilt the saw track about axis B, the brace 116 is disassembled by removing the pull pin 122 at the upper end and lifting the lower end of the brace 116 from the plug 130. The saw track and the table base 12 is then tilted about axis B and is locked in position by aligning the openings 136 in the tilt arm bar 134 with the openings 132 in the lock bracket 128 and inserting a removable pin 138 therein. The connection of the tilt arm bar 134 through the pivot mount 62 allows the saw track 50 to further pivot about axis A and is secured in the desired position by lock rod 67 in the normal fashion. This construction allows the portable saw table 10 to be tilted and pivoted for cutting mitre angles other than 90°.

Figure 16:
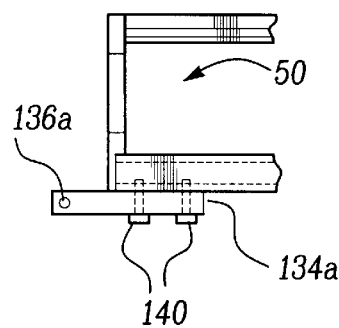
FIG. 16 is a partial view of the left side of a further embodiment of the portable saw table.

In the embodiment of FIG. 16, the tilt arm bar 134a is shorter than the tilt arm bar 134 of FIGS. 14 and 15 and is secured to the saw track by fasteners 140. When the tilt arm bar 134a is used, the saw track can only be tilted about axis B after removal of brace 116 to achieve only a 90° mitre cut. The saw track 50 is locked in the same fashion as before by aligning the openings 136a with the openings 132 in the lock bracket 128 and inserting a pull pin 138.

The embodiment shown in FIGS. 19–21 is similar to that shown in FIG. 16 and incorporates a bracket 145 that is bolted to the end of the table base 60 and includes flanges 146, 147 at right angle to one another such that the angle 146 engages the end of the table base and the angle 147 engages the undersurface of the table base. A projection 148 extends forwardly and is adapted to be connected and disconnected to the lock bracket 128 by a removable pin 138.

Further, in accordance with the invention, if necessary, provision is made for counterbalancing the weight of the portable saw on the slide plate S and comprises a removable counterbalance assembly 150 that is adapted to be removably mounted on the support 58 extending between the track base 60 and the track rails 52,54. The counterbalance assembly 150 includes a housing 151 in which a coil spring in the form of a flat substantially constant tension band TB is provided such that when the band TB is extended, tension is applied to the band. Housing 151 is in turn mounted on a bracket 152 that has a flange 153 for engaging the back support 58 at one end and a flange 154 at the other end with a screw 155 having a knob such that it can be turned to clamp the bracket in position. The end of the band TB is adapted to be removably engaged with a pin 156 on the slide plate S such that as the slide plate S with the portable slide thereon is moved along the track, the spring counterbalances the weight of the saw.

Figure 25:
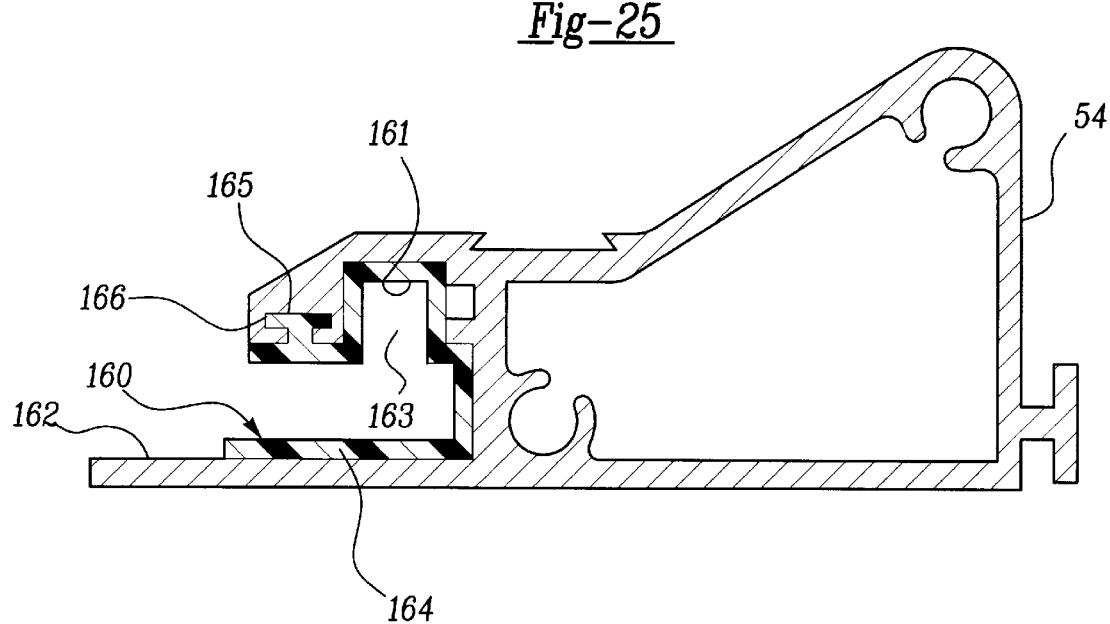
FIG. 25 is a fragmentary enlarged view of a portion of a portion of the saw track.
Figure 26:
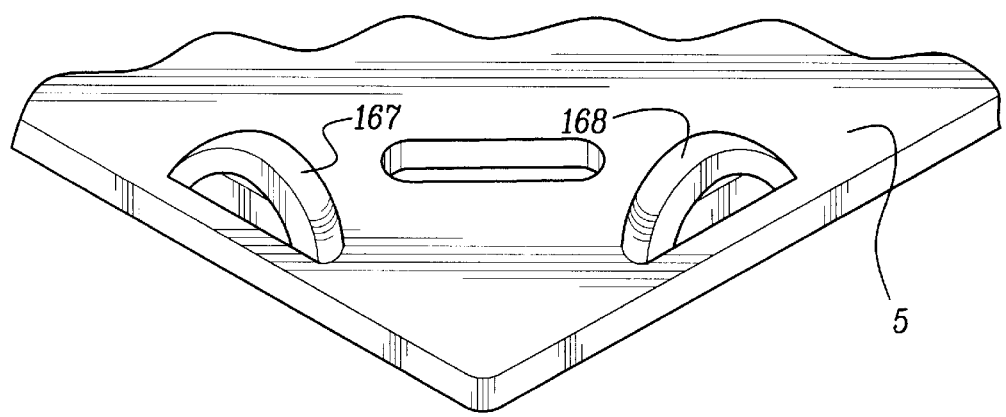
FIG. 26 is a fragmentary perspective view of a portion of the saw slide shown in FIGS. 22 and 23.

In accordance with another aspect of the invention, the tracks 52,54 have a cross section into which a plastic insert 160 (FIGS. 23 and 25) is provided that cooperates with the presently described configuration of the slide S to provide lateral stability to the slide as it is moved relative to the tracks. As shown in FIG. 25, the track 54 comprises an extruded member that has a recess 161 and a flat surface 162 in which the insert is positioned to define a generally vertical downwardly opening recess 163 and a support surface 164 for the slide plate. The insert 160 is retained in the track 54 by a T-shaped projection 165 engaging a complementary recess 166.

Saw slide S is provided with spaced projections 167 along one side and similar projections 168 along another side at a right angle to the slide. The projections are preferably formed by punching portions of the metal upwardly as by stamping. In the position shown in FIG. 22, projections 168 engage the recess 163. When the saw is rotated 90° by removing the slide S and rotating the slide 90° and re-inserted, the projections 167 will engage the corresponding recess 163 in the track 52. By such an arrangement, lateral stability is provided between the slide plate and the tracks and therefore accurate movement of the saw is insured.

In accordance with another feature as shown in FIGS. 22–24, provision is made for locking the slide S in any desired position by a locking mechanism that includes a locking screw 170 that is threaded on a bracket 171 fixed to the upper side of the slide and having an end 172 extending through an opening in the slide plate S into frictional engagement with a portion of the track 54.

Thus, it can be seen that the present invention provides portable tilting saw table capable of supporting large workpieces while allowing rip-cutting and cross-cutting operations to be performed. In accordance with another aspect of the invention, a novel saw track and saw slide construction is provided that provides improved lateral stability for the saw table as supporting the portable saw as the slide is moved lengthwise of the saw track.

What is claimed is:

1. A portable tilting saw table comprising:

an elongated table base having a longitudinal axis, pivot means supporting said table base for tilting movement about a horizontal axis, a saw track mounted on said table base for tilting movement with said table base about said horizontal axis and for pivotal movement relative to said table base about a second axis, and interconnecting means for holding said table base in horizontal and tilted positions, said interconnecting means comprising a cross-strut, a sector member, said sector member being connected at one end to said table base at said pivot means, said sector member having an opposite end, and locking means connecting said opposite end of said sector member to said cross-strut.

2. The portable tilting saw table set forth in claim 1 wherein said pivot means comprises an end member secured to a bottom surface at each end of said table base, a U-bracket at each end of said table base with one end secured to said end member, respectively, said U-bracket having two sides and an opening through each side of said U-bracket, said support means having an upper end and an opening therethrough and being received in said U-bracket, and a removable bolt extending through the opening in each side of said U-bracket and said support means.

3. The portable tilting saw table set forth in claim 2 wherein said pivot means comprises a bolt means connected to said sector member.

4. A portable tilting saw table comprising, an elongated table base having a longitudinal axis, a saw track pivotally mounted on said table base pivot means supporting said table base for tilting movement about a horizontal axis, interconnecting means for holding said table base in horizontal and tilted positions, said interconnecting means comprising a cross-strut, a sector member said sector member being connected at one end to said table base at said pivot means, said sector member having an opposite end, locking means connecting said opposite end of said sector member to said cross-strut, said sector member comprising a first elongated leg connected to said saw track, a second elongated leg extending from one end of said first leg, and an arcuate leg interconnecting free ends of said first and second legs defined by an arc having a radius with a center at said horizontal axis, said legs lying in a plane perpendicular to said horizontal axis.

5. The portable tilting saw table set forth in claim 4 wherein said locking means is foot operated.

6. The portable tilting saw table set forth in claim 5 wherein said foot operated locking means comprises a foot lever pivotally connected to said cross-strut, a spring connected between said foot lever and said cross-strut for urging said foot lever away from said cross-strut, a first bracket attached to said foot lever, a friction pad secured to said first bracket, a second bracket attached to said cross-strut, a second friction pad received in said second bracket, wherein said first friction pad is spaced from said second friction pad to receive the opposite end of said sector member therebetween such that said spring normally urges said second friction pad toward said first friction pad to frictionally retain said sector member.

7. A portable tilting saw table comprising:

an elongated table base having a longitudinal axis, pivot means supporting said table base for tilting movement about a horizontal axis.

a saw track mounted on said table base for tilting movement with said table base about said horizontal axis and for pivotal movement relative to said table base about a second axis, and interconnecting means for holding said table base in horizontal and tilted positions, wherein said saw track comprises spaced tracks in which a slide plate is provided, said slide plate having a slot through a central portion of said plate for receiving a saw blade between said tracks and at least one side provided with longitudinally extending vertical projections, at least one of said spaced tracks having a longitudinally extending vertically extending groove therein for receiving said projections and for guiding said plate and restraining said plate against lateral movement.

8. The portable tilting saw table set forth in claim 7 wherein said saw track includes a plastic insert having said groove therein.

9. The portable tilting saw table set forth in claim 8 wherein said saw plate is square and has a second side at a right angle to said one side and includes longitudinally extending second set of vertical projections on said second side at a right angle to said one side having the projections such that when the saw plate is rotated 90° and reinserted in the saw track said second set of projections engage the groove in the track.

10. The portable tilting saw table set forth in any one of claims 7–9 including locking means on a corner of the saw plate for frictionally engaging the saw track for locking the saw plate in position as desired.

* * * * *